United States Patent
Lambeth et al.

(10) Patent No.: US 8,579,203 B1
(45) Date of Patent: Nov. 12, 2013

(54) ELECTRONIC MAGNETIC RECORDED MEDIA EMULATORS IN MAGNETIC CARD DEVICES

(75) Inventors: David N. Lambeth, Pittsburgh, PA (US); Bruce S. Cloutier, Jeannette, PA (US)

(73) Assignee: Dynamics Inc., Pittsburgh, PA (US)

( * ) Notice: Subject to any disclaimer, the term of this patent is extended or adjusted under 35 U.S.C. 154(b) by 24 days.

(21) Appl. No.: 13/303,466

(22) Filed: Nov. 23, 2011

Related U.S. Application Data

(63) Continuation of application No. 12/640,584, filed on Dec. 17, 2009.

(60) Provisional application No. 61/139,531, filed on Dec. 19, 2008.

(51) Int. Cl.
| | |
|---|---|
| *G06K 19/06* | (2006.01) |
| *G06K 19/00* | (2006.01) |
| *G06K 7/08* | (2006.01) |
| *G06K 5/00* | (2006.01) |
| *H05K 1/14* | (2006.01) |
| *G06Q 40/00* | (2012.01) |
| *G06Q 20/00* | (2012.01) |
| *H04Q 5/22* | (2006.01) |
| *G08B 13/14* | (2006.01) |

(52) U.S. Cl.
USPC ........... 235/492; 235/380; 235/449; 235/450; 235/487; 235/493; 361/737; 705/41; 705/64; 705/65; 340/572.1; 340/10.1

(58) Field of Classification Search
USPC .......... 361/737; 235/380, 449, 450, 487, 492, 235/493; 705/41, 64, 65; 340/572.1, 10.1
See application file for complete search history.

(56) References Cited

U.S. PATENT DOCUMENTS

| | | | |
|---|---|---|---|
| 3,619,570 A | 11/1971 | Grosbard | |
| 3,643,064 A | 2/1972 | Hudson, Jr. | |
| 3,656,128 A | 4/1972 | Aaland | |
| 3,660,828 A | 5/1972 | Irons et al. | |
| 3,986,206 A * | 10/1976 | Fayling | 360/2 |
| 4,236,230 A | 11/1980 | Thompson | |
| 4,353,064 A | 10/1982 | Stamm | |
| 4,394,654 A | 7/1983 | Hofmann-Cerfontaine | |
| 4,593,209 A | 6/1986 | Sloan | |
| 4,614,861 A | 9/1986 | Pavlov et al. | |
| 4,667,087 A | 5/1987 | Quintana | |
| 4,668,913 A | 5/1987 | Vinal | |
| 4,672,183 A * | 6/1987 | De Feo | 235/449 |
| 4,701,601 A | 10/1987 | Francini et al. | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Daniel Walsh

(57) ABSTRACT

A card (e.g., a payment card) or device (e.g., a token or phone) is provided with a magnetic emulator having a soft magnetic material whose reluctance is controlled.

19 Claims, 10 Drawing Sheets

(56) References Cited

U.S. PATENT DOCUMENTS

| | | |
|---|---|---|
| 4,720,860 A | 1/1988 | Weiss |
| 4,736,122 A | 4/1988 | Opie et al. |
| 4,786,791 A | 11/1988 | Hodama |
| 4,791,283 A * | 12/1988 | Burkhardt .................. 235/438 |
| 4,797,016 A | 1/1989 | Lahr |
| 4,797,542 A | 1/1989 | Hara |
| 5,038,251 A | 8/1991 | Sugiyama et al. |
| 5,166,501 A * | 11/1992 | Woolley ...................... 235/488 |
| 5,168,520 A | 12/1992 | Weiss |
| 5,237,165 A | 8/1993 | Tingley, III |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,473,147 A * | 12/1995 | Hoshino et al. ............... 235/449 |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A * | 4/1997 | Lane ............................ 382/124 |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 5,973,494 A | 10/1999 | Masreliez et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,129,277 A * | 10/2000 | Grant et al. .................... 235/449 |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,438,026 B2 * | 8/2002 | Gillies et al. .................. 365/158 |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,857,569 B1 | 2/2005 | Smith, Sr. et al. |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 * | 8/2006 | Cooper .......................... 235/449 |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,201,324 B2 * | 4/2007 | Mann et al. .................... 235/487 |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 * | 1/2010 | Brown et al. .................. 235/493 |
| 7,660,902 B2 | 2/2010 | Graham et al. |
| 7,686,230 B2 * | 3/2010 | Yamaguchi et al. .......... 235/493 |
| 7,828,207 B2 | 11/2010 | Cooper |
| 8,020,775 B2 * | 9/2011 | Mullen et al. ................. 235/493 |
| 8,382,000 B2 * | 2/2013 | Mullen et al. ................. 235/493 |
| 2001/0011684 A1 * | 8/2001 | Krause ........................... 235/492 |
| 2001/0017752 A1 | 8/2001 | Hoshiya |
| 2001/0034702 A1 | 10/2001 | Mockett et al. |
| 2001/0047335 A1 | 11/2001 | Arndt et al. |

(56) References Cited

U.S. PATENT DOCUMENTS

| | | |
|---|---|---|
| 2002/0017568 A1* | 2/2002 | Grant et al. .................... 235/491 |
| 2002/0059114 A1 | 5/2002 | Cockrill et al. |
| 2002/0082989 A1 | 6/2002 | Fife et al. |
| 2002/0096570 A1* | 7/2002 | Wong et al. ................... 235/494 |
| 2002/0120583 A1* | 8/2002 | Keresman et al. ............. 705/65 |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0117735 A1 | 6/2003 | Yasunaga et al. |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1* | 2/2004 | Silverman .................... 235/493 |
| 2004/0133787 A1* | 7/2004 | Doughty et al. .............. 713/186 |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0038014 A1* | 2/2006 | Mann et al. ................... 235/449 |
| 2006/0041759 A1 | 2/2006 | Kaliski et al. |
| 2006/0085328 A1 | 4/2006 | Cohen et al. |
| 2006/0091223 A1* | 5/2006 | Zellner et al. ................ 235/492 |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0219786 A1 | 10/2006 | Hasegawa |
| 2006/0256961 A1 | 11/2006 | Brainard et al. |
| 2007/0034700 A1* | 2/2007 | Poidomani et al. ........... 235/492 |
| 2007/0096725 A1 | 5/2007 | Inomata |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1* | 10/2007 | Brown et al. ................. 235/380 |
| 2007/0241201 A1* | 10/2007 | Brown et al. ................. 235/493 |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massacusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0084627 A1 | 4/2008 | Roshchin et al. |
| 2008/0096326 A1 | 4/2008 | Reed |
| 2008/0121726 A1* | 5/2008 | Brady et al. .................. 235/493 |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0045262 A1 | 2/2009 | Cook, Jr. et al. |
| 2009/0046522 A1 | 2/2009 | Sepe et al. |
| 2009/0048971 A1* | 2/2009 | Hathaway et al. ............... 705/41 |
| 2009/0108064 A1 | 4/2009 | Fernandes et al. |
| 2009/0150295 A1 | 6/2009 | Hatch et al. |
| 2009/0152365 A1* | 6/2009 | Li et al. ........................ 235/493 |
| 2009/0159701 A1* | 6/2009 | Mullen et al. ................. 235/493 |
| 2009/0159708 A1* | 6/2009 | Mullen et al. ................. 235/493 |
| 2009/0159713 A1* | 6/2009 | Mullen et al. ................. 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0316462 A1 | 12/2009 | Xi et al. |
| 2010/0246061 A1 | 9/2010 | Sechi |
| 2010/0321824 A1 | 12/2010 | Dugas et al. |
| 2011/0028184 A1* | 2/2011 | Cooper ......................... 455/556.1 |
| 2011/0266354 A1* | 11/2011 | Poidomani et al. ........... 235/492 |
| 2011/0267720 A1 | 11/2011 | Fernandez-de-Castro |
| 2011/0272466 A1* | 11/2011 | Mullen et al. ................. 235/488 |
| 2011/0272467 A1* | 11/2011 | Mullen et al. ................. 235/488 |
| 2012/0234927 A1 | 9/2012 | Poidomani et al. |
| 2012/0235794 A1 | 9/2012 | Poidomani et al. |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770, 2003.

* cited by examiner

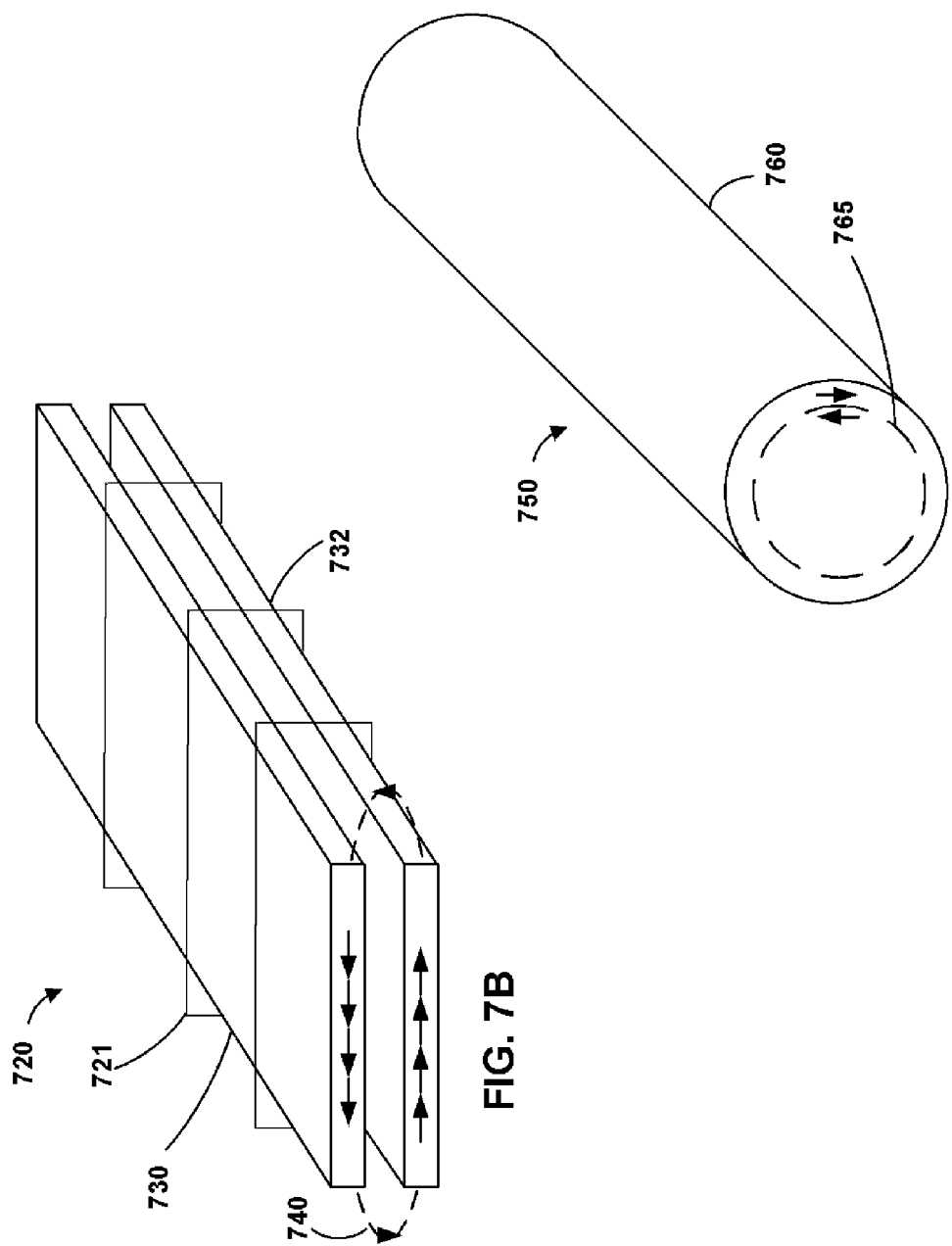

ELECTRONIC MAGNETIC RECORDED MEDIA EMULATORS IN MAGNETIC CARD DEVICES

CROSS-REFERENCE TO RELATED APPLICATION

This application is a continuation of U.S. patent application Ser. No. 12/640,584, filed on Dec. 17, 2009, which claims the benefit of U.S. Provisional Patent Application No. 61/139,531 filed on Dec. 19, 2008, which is hereby incorporated by reference herein in its entirety.

BACKGROUND OF THE INVENTION

This invention relates to electromagnetic devices and systems for transmission of data to magnetic card readers.

Cards containing one or more magnetic media tracks with recorded data patterns are used for many types of systems such as identification cards, security cards, entry cards, credit cards, gift cards, cash cards and payment systems. The magnetic stripes of conventional cards contain patterns of reversing magnetic orientation, which are permanently impressed upon a semi-hard layer of magnetic material. The physical location of the magnetization transitions can determine the data sequence via an information code such as F2F (Frequency Two Recording), MFM (Modified Frequency Modulation) or other more complex RLL (Run Length Limited) codes. The magnetically recorded data patterns are unique to the individual user or application, hence, the data pattern is essentially fixed in time. The data is recorded on the card and then provided to the user. Hence, a different card is required for each financial account forcing one to have multiple cards.

In use, the card is transported past a magnetic read head, or heads, which reads the magnetic data pattern. This transport of the magnetic stripe of the card adjacent to a magnetic data read head generates a data pattern signal. The read-heads detect a data pulse due to the time rate of change of the magnetic flux coupled into the read-head from the magnetic stripe. More than one magnetic read-head can be provided in a magnetic card reader so that more than one magnetic track can be read in parallel from magnetic data tracks.

Thus, magnetic card readers are fixed in design and operate according to parameters designed to accommodate conventional cards with permanently fixed magnetic media. What is needed is a card that can communicate with existing magnetic card readers using a communications method other than a traditional, static magnetic stripe.

SUMMARY OF THE INVENTION

A card having a dynamic magnetic stripe communications device is provided. In some embodiments, the dynamic magnetic stripe communications device can include a coil that encompasses a magnetic material. The dynamic magnetic stripe communications device can transmit programmable data patterns by controlling the reluctance of the dynamic magnetic stripe communications device. By controlling the reluctance, the card can ensure that data is transmitted to magnetic card readers in a manner that enables the card reader to accurately process the data. Reluctance may be controlled in one of several ways. In one embodiment, the anisotropy of the magnetic material encompassed by the coil may be aligned in a direction to produce a desired reluctance in a magnetic circuit formed, for example, between the magnetic stripe communications device and the magnetic reader transducer. In another embodiment, for example, the reluctance may be controlled by proper selection of the width and thickness of the magnetic material encompassed by the coil. In another embodiment, for example, a bias magnetic field may be applied to the magnetic material to produce a desired reluctance in the magnetic circuit.

A dynamic magnetic communications device may include a coil and magnetic material for each separate track. Accordingly, for example, two coils, each coil having its own magnetic material, may be provided to communicate two tracks of information.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIGS. 7A-7C illustrates dynamic magnetic stripe communications devices constructed in accordance with the principles of the present invention;

DETAILED DESCRIPTION OF THE INVENTION

Figure 1:
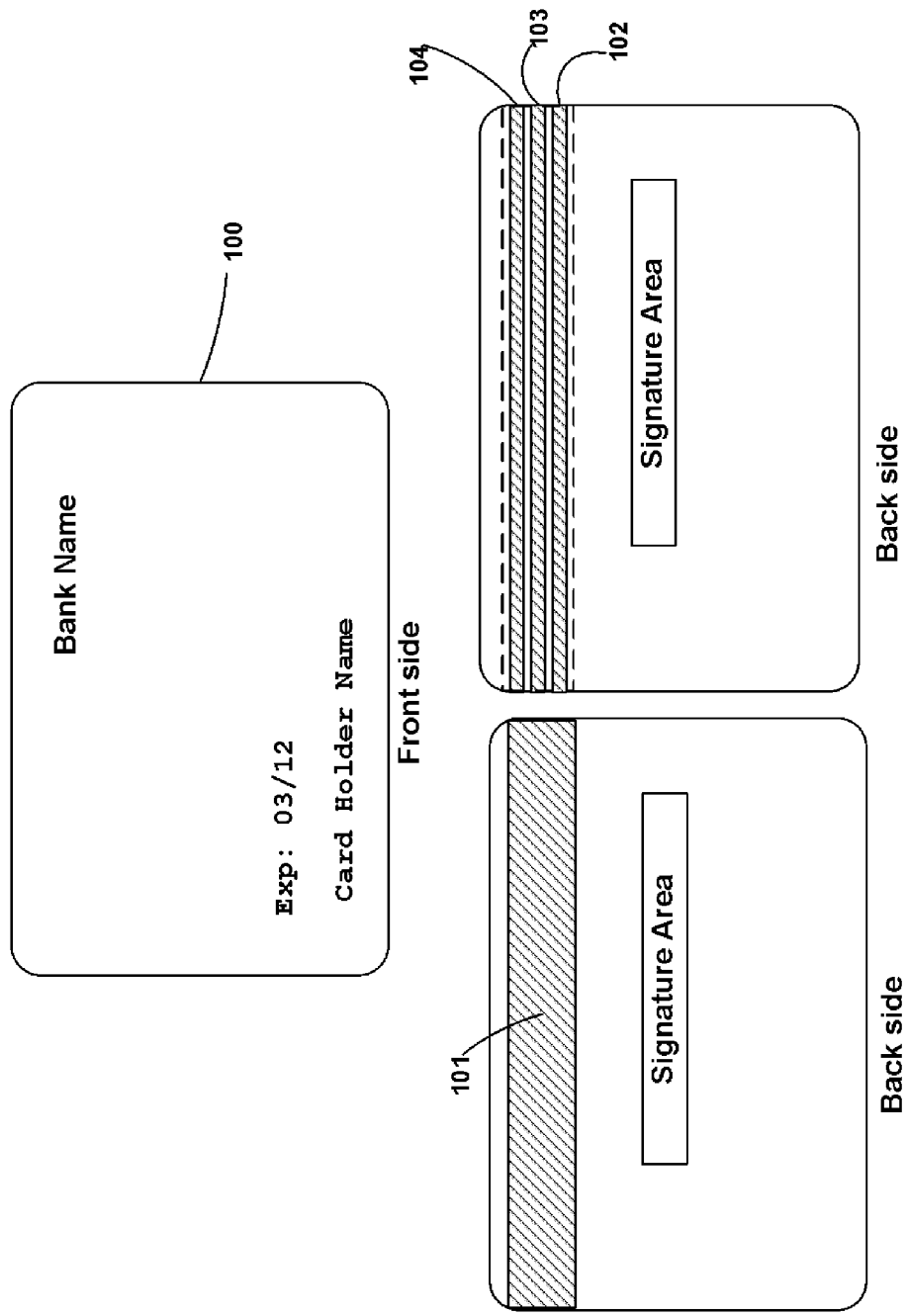
FIG. 1 illustrates a conventional card with a magnetic stripe.

FIG. 1 shows a schematic of traditional magnetic card 100 with a magnetic stripe of material 101. Material 101 is referred to as being a hard magnetic material as it has a long-term memory effect. This stripe of material 101 can include multiple recorded magnetic tracks, as indicated by magnetic data tracks 102, 103, and 104. Each track may have a recorded magnetization pattern and a magnetization vector oriented along the track direction and is largely oriented in the plane of the strip. Transitions in the magnetization vector direction, from pointing either from left to right or from being right to left represent a raw data bit "1" while regions where there are no transitions represent "0" raw data bits. When the magnetization vectors on the two sides of each transition are opposing, a magnetic field emanates somewhat out of the media plane. A read head detects this magnetic field when the card is swiped through magnetic card reader. The card reader is operative to look for these magnetic fields based on predetermined time intervals. Thus, a lack of a transition at a predetermined time interval may be registered as a "0," whereas a transition may be registered as a "1."

Figure 2:
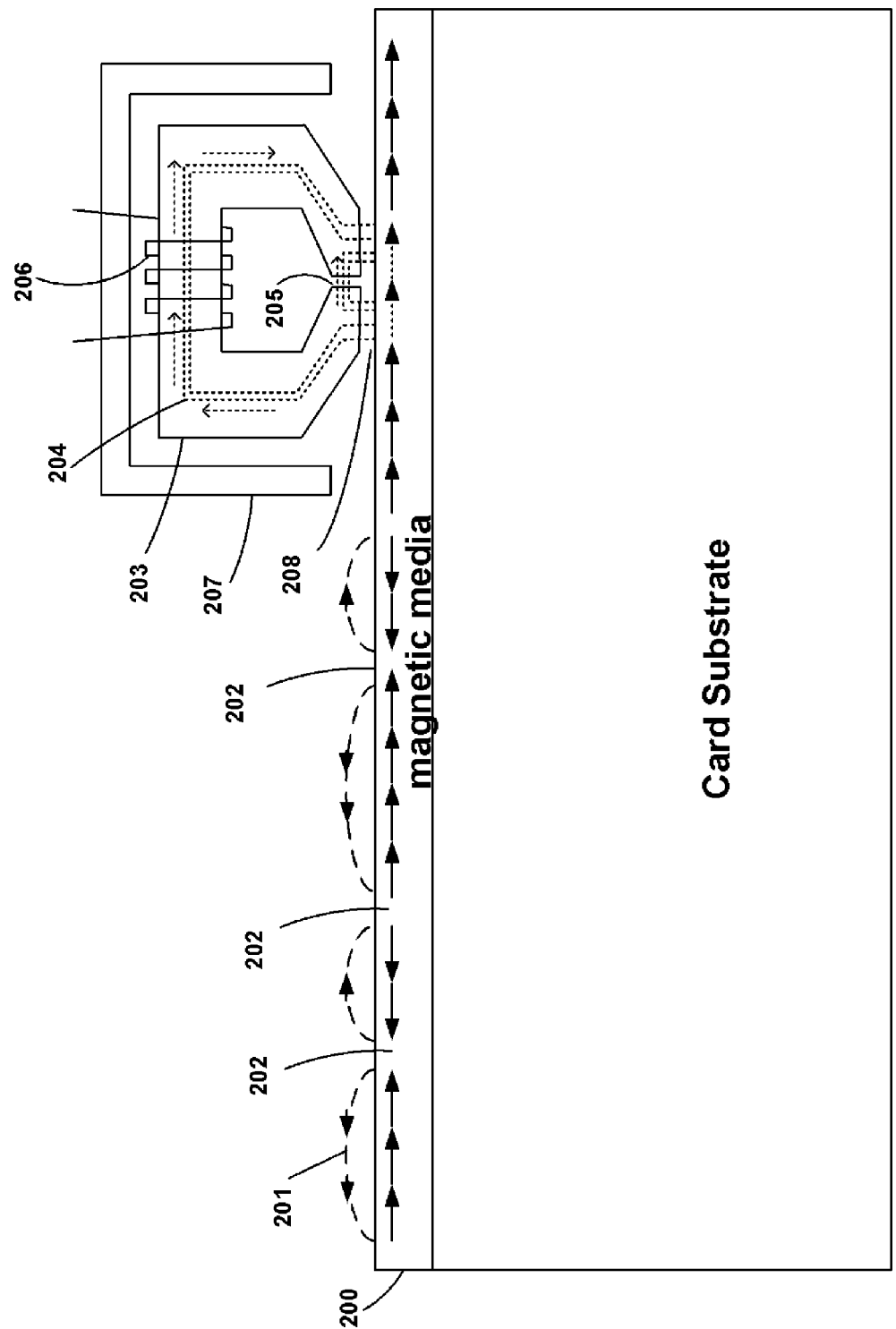
FIG. 2 illustrates a cross-section of a read-head and magnetic media of a conventional magnetic card reader.

FIG. 2 shows a cross-sectional illustration of a conventional read-head. FIG. 2 also shows a card having a magnetic stripe 200 that passes under read-head 203. Magnetic stripe 200 can include several magnetic material transitions, which are delineated by regions 202. A magnetic field 201 may emanate from each transition region. Magnetic field 201 may have magnetic field intensity, sometimes referred to as H. Magnetic field 201 can couple to read head 203 as it passes within a predetermined proximity of read head 203. When it couples, a portion of the magnetic flux follows a path 204 (e.g., a relatively low reluctance path) through the ring structure of the read head, and/or through path 205 (e.g., a higher reluctance path), which includes the head gap region of read-head 203. As the flux passes though the coil 206 that is wrapped around the ring structure of read-head 203, the flux is inductively linked to coil 206. As the flux varies over time, it induces a voltage signal at the terminals of coil 206, Vs=−d(flux)/dt. Provided the time variance of the flux is sufficiently large compared to any electronic noise that may exist, the signal can be detected.

FIG. 2 also illustrates a magnetic shield 207 around the magnetic head used to prevent extraneous stray magnetic fields from reaching selective portions of read-head 203. Head gap 210 has a short dimension in series with the magnetic ring structure and a long dimension cutting across the ring structure such that the head is sensitive to magnetic field vectors that are parallel to the head gap's short dimension or sensitive to field vectors that are perpendicular to the media surface, while essentially insensitive to field vectors that are normal to the drawing surface. This later direction is referred to as being the crosstrack direction. Thus, the short dimension direction of head gap 210 is the direction that traverses along magnetic strip 200. The magnetic trackwidth (not shown), which may be similar in size to the thickness of the read head, is oriented perpendicular to the shortest dimension of the head gap region and is large compared to the distance between, and the size of, the magnetic transition regions.

Figure 3:
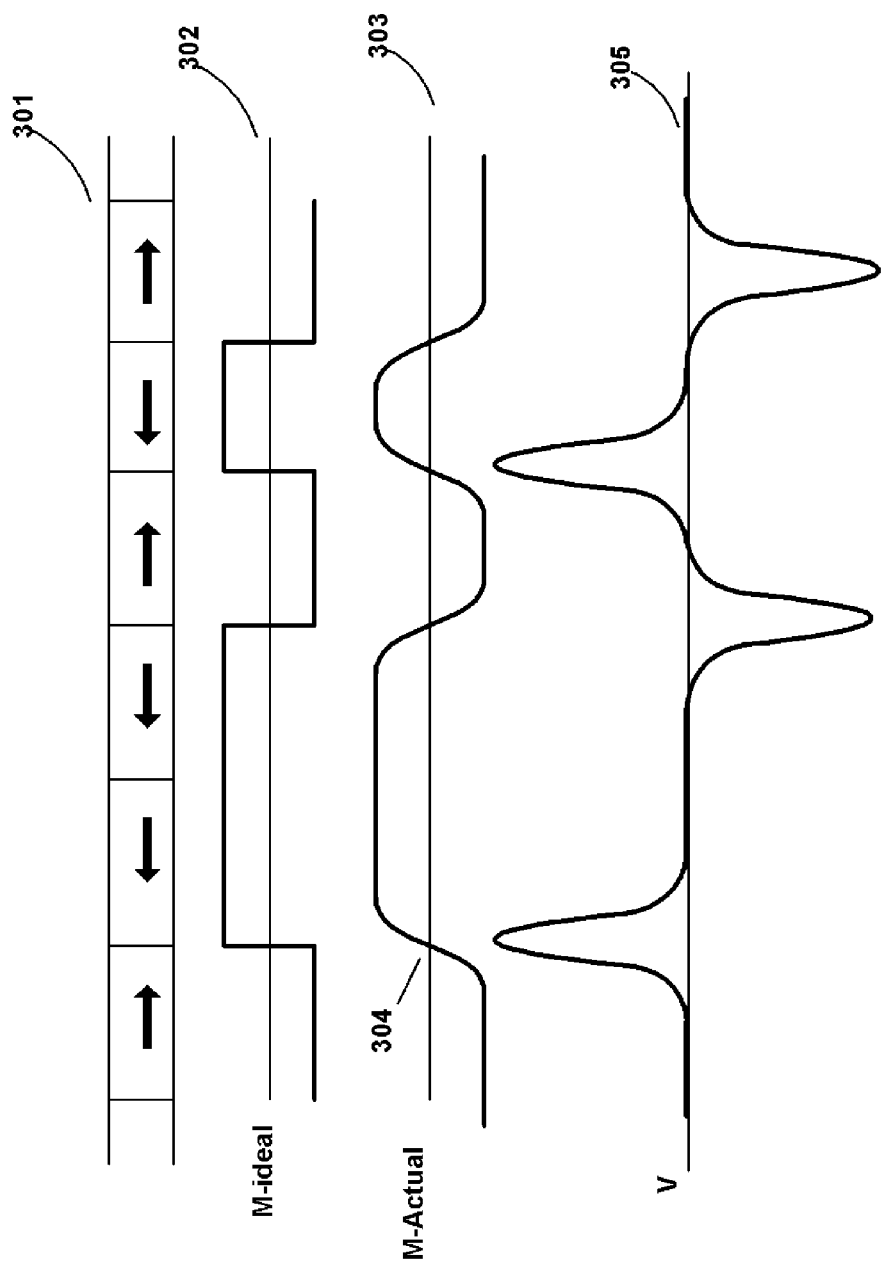
FIG. 3 illustrates several waveforms.

FIG. 3 shows several waveforms that may be derived from a magnetic stripe having a predetermined arrangement of magnetic transitions. Waveform 302 plots the ideal magnetization, $M_{IDEAL}$, of magnetic stripe 301. However, due to intrinsic magnetic properties of stripe 301, transitions may not be instantaneous, but rather, may exhibit an arctangent transition, as represented by waveform 303, $M_{ACTUAL}$. An enlarged view of an arctangent transition in waveform 303 is shown in waveform 304. Waveform 305 illustrates a voltage signal picked up by read-head 203 as a card with magnetic stripe 301 is swiped through a card reader. Waveform 305 may represent a Lorentzian pulse shape.

The voltage signal derived from the terminals of a sensing coil of a read head may be represented as:

$$V(x) \propto \frac{\partial}{\partial x}\left[\arctan\left(\frac{x-x_o}{a}\right)\right]$$

where "x" is the spatial position of the head gap relative to the magnetic waveform signal, "$x_o$" is the location of the center of the magnetic transition and "a" is a constant representative of the observed transition width. This transition width is caused by both the non-ideally sharp step function shape of the magnetization transition, the finite length of the head gap, and the non-zero spacing of the gap from the media surface.

Figure 4:
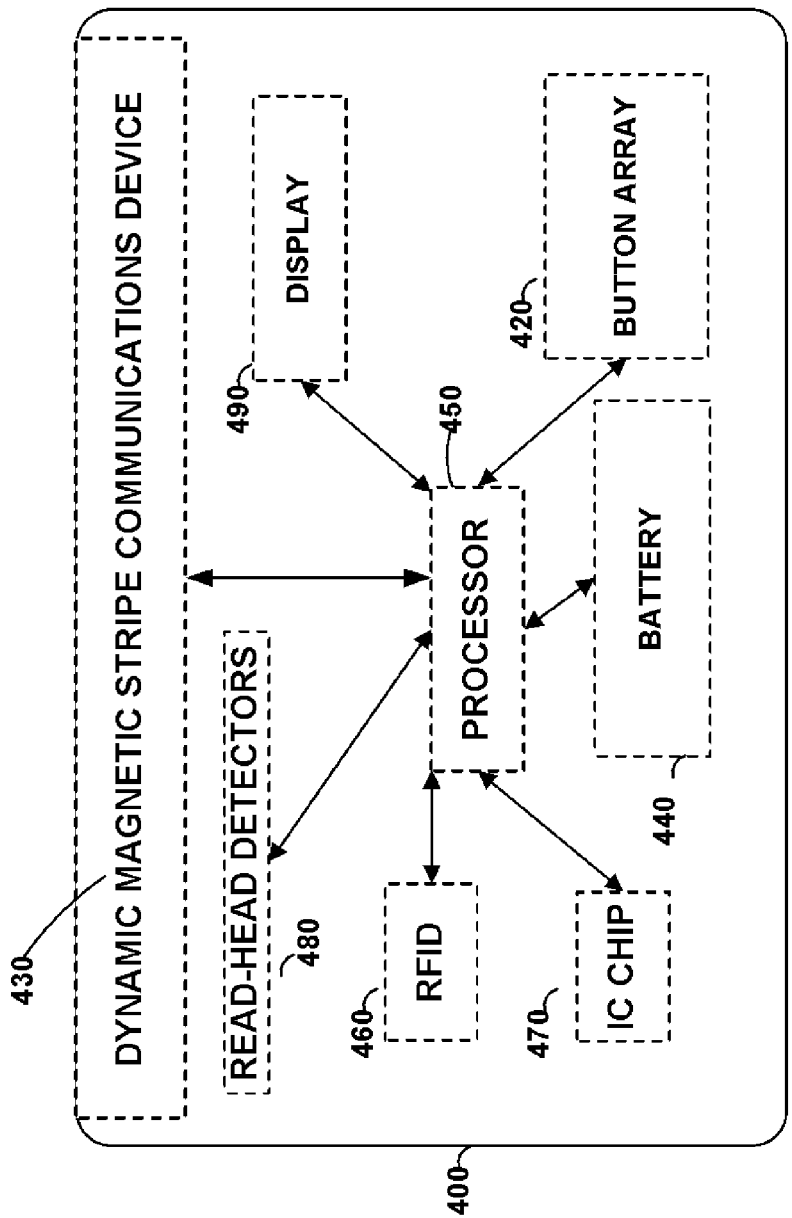
FIG. 4 illustrates an electronic card constructed in accordance with the principles of the present invention.

FIG. 4 shows electronic card 400. Electronic cards may include a dynamic magnetic stripe communications device (e.g., also occasionally considered herein as an electronic stripe) to emulate waveforms such as, for example, waveform 303 of FIG. 3 so that card readers derive, for example, Lorentzian shaped signals, or approximately Lorentzian shaped signals from media and devices other than a traditional, static magnetic stripe.

Electronic card 400 may include, for example, printed information, display 490, and key pad buttons 420. Card 400 may be, for example, an identification card or a payment card such as a credit card, debit card, and/or gift card. Payment information, such as a credit/debit card number may be provided as static information (e.g., a static magnetic stripe) and/or dynamic magnetic stripe communications device 430, or any combination thereof. Dynamic magnetic stripe communications device 430 may, for example, emulate data of a magnetic stripe by serially transmitting data to a card reader. Such a communication may be electromagnetic in nature. Dynamic magnetic stripe communications device 430 may be positioned in the same location as a magnetic stripe and may be capable of communicating multiple tracks of information (e.g., two, three, four or more tracks). In some embodiments a magnetic stripe may co-exist on card 400 with dynamic magnetic communications device 430. In another embodiment, a device may be provided on card 400 that may encode data on a magnetic stripe by re-arranging the magnetic transitions provided on that magnetic stripe.

Card 400 may include a power source 440 (e.g., a battery), an inductive battery re-charging coil, a microcontroller 450 and processing electronics and alternative electronic communication systems such as radio frequency data transmitter and receiver for RF communication, optical transmitter and receiver, and audio transmitter and receiver (e.g., a microphone and speaker). Card 400 may optionally include radio frequency identification circuitry 460 and IC chip 470 (e.g., smart card IC chip or EMV chip). Persons skilled in the art will appreciate that a coil included in a dynamic magnetic stripe communications device may also be utilized, for example, to re-charge one or more batteries included in card 400.

Indicators may be provided to notify the user that data is being, or has been, transferred. For example, once the personal information has been entered into the electronic card, the card may transmit this information to a magnetic card reader.

To preserve energy and to set up trigger timing, card reader detection sensors 480 may be provided, for example, to detect the presence of the magnetic card reader head during a card swipe. A number of proximity sensors, or arrays of sensors, based on various physical phenomena may be used for this detection. A card may include, for example, light, pressure, resistive, capacitive, magnetic and acceleration sensors to detect a read-head or swipe of the card. For example, a detector may detect changes in capacitance, piezo or pryroelectric, inductive, magneto-resistive, Hall Effect, and optical signals. Conductivity or capacitance changes may, for example, be used to detect conductive parts of the card reader such as, for example, a metallic head housing.

Arrays of a sensor type or sensor arrays based upon multiple technologies can be configured to detect signature profiles of particular readers such that particular readers, or classes of readers, may be identified. Read-head detectors can be used, for example, to determine the direction and speed of transport. This information can be used to trigger a single or multiple transmissions of data patterns via dynamic magnetic stripe communications device 430. In addition, for example, the entry of code, such as a PIN (Personal Identification Number), via button array 420 can be used as a signal to begin transmission of data, multiple data transmissions, or repeating data transmissions. A data start code and a data end code may be provided (e.g., inserted into a data transmission communicated from a dynamic magnetic stripe communications device) such that multiple transmissions may be identified.

Current may be provided through a single long straight wire to generate a magnetic field circulating around the wire having an amplitude that falls off as one over the radial distance from the center of the wire. A single wire may, for example, generate a field that can be detected by a magnetic card reader if, for example, sufficient current in the wire is employed. When current is turned on, off, or is reversed (e.g., with respect to a coil of a dynamic magnetic stripe communications device), a time rate of change in the magnetic flux may be produced that radiates physically about the wire and may couple to a head structure (e.g., an inductive head structure). However, for some current levels this signal can be small and may be highly localized to the region immediately around the wire. Even when a high level of current is provided, for example, alignment of the head gap to the wire may be critical in order for the signal to be detected by a read-head.

A sheet current may be used to generate a magnetic field parallel to the sheet and at a right angle to the current flow. The magnetic field above the current sheet is in the opposite direction from the field generated below the current sheet. A set of parallel, closely spaced conductors, such as wires, with current flowing in the same direction may be provided and used, for example, to approximate a sheet current. If the time rate of change of the current and density of conductors is sufficient then, for example, the magnetic flux change may be sufficiently large to excite the magnetic head and generate a head coil voltage signal greater than, for example, any threshold provider in a reader to discriminate against electronic noise. However, if there are two parallel sheets have opposing currents then the fields produced between the sheets is summed while the fields outside of the sheets cancels, assuming that the sheets extend to infinity in all directions. Thus, for example, no field exists outside of these two sheets.

The sheet may be, for example, either infinite or finite in the current flow direction, but finite in width, such that a field may exist outside of the sheets as some flux may escape from the exposed edge ends to wrap back around to the other edge end. Such a configuration may be used to generate a field that can couple to a magnetic card read-head. The field strength coupling may be, for example, the strongest at the edges of the pair of sheets and the weakest when the read-head is located in the middle. As the sheets are made wide compared to the spacing between the sheets the field and flux density near the outside surface of either sheet may tend to be small or vanish. Coupling to a magnetic read-head may be weaker in such areas than near the edges. Likewise, the flux picked up by the head may, for example, be non-uniform as a function of position along the length of the sheet. A tightly wound, flat cross-sectional shaped coil may also be provided. The magnetic field pattern generated by this idealized pair of finite sheet conductors may essentially approximate, for example, the magnetic field pattern of a tightly wound, flat cross-sectional shaped, coil.

By orienting the conductors, for example, the field may be provided in the same direction as those generated by the magnetic regions of a magnetic stripe. This orientation may be provided in a coil structure, for example, used in a dynamic magnetic stripe communications device.

Figure 5:
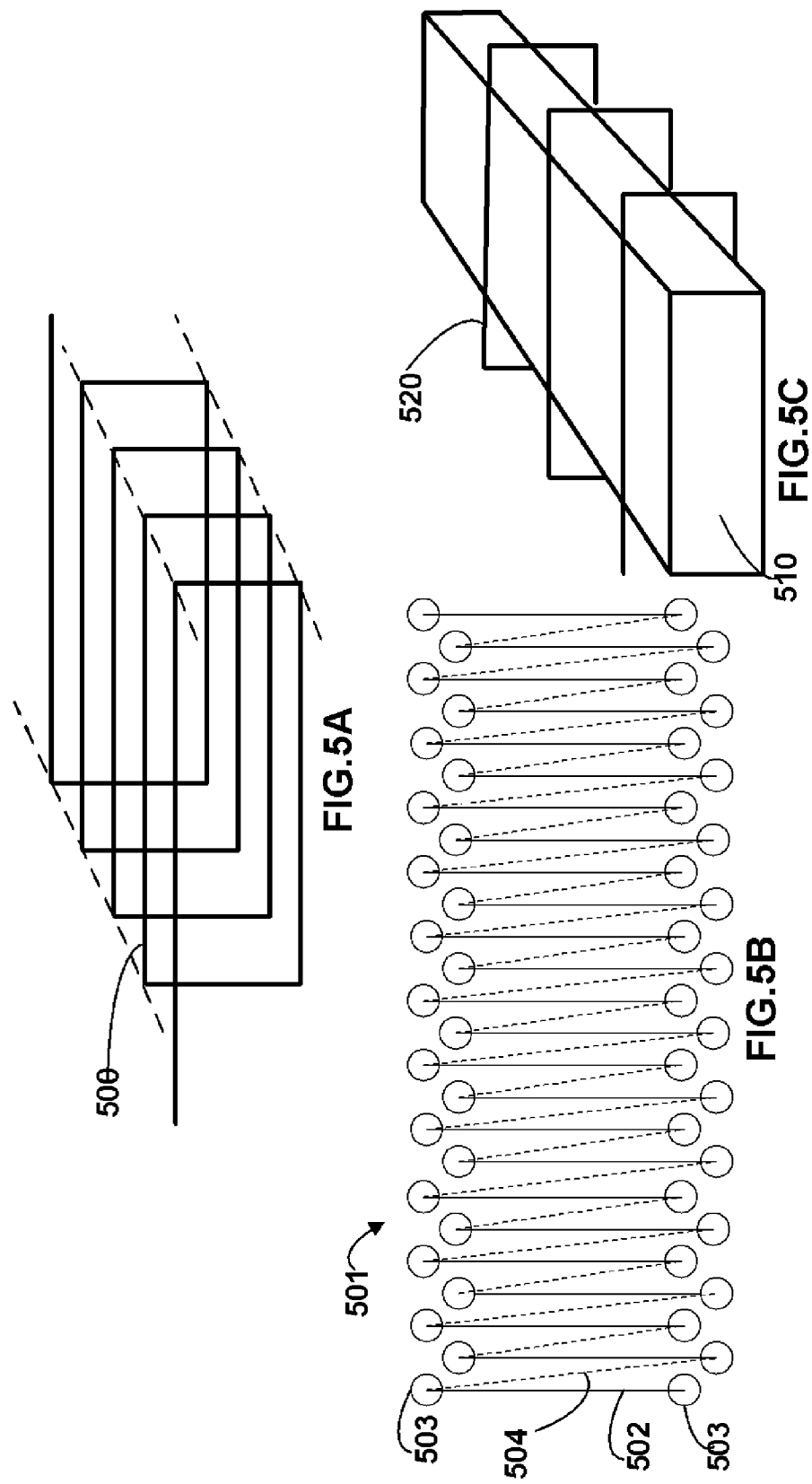
FIGS. 5A-5C illustrates dynamic magnetic stripe communications devices constructed in accordance with the principles of the present invention.

FIG. 5A shows coil 500 that may, for example, form part of a dynamic magnetic communications device. Coil 500 may exhibit, for example, a short, flattened, solenoid shape. Coil 500 as a short, flattened solenoid shaped coil, however, may be configured to desirably fit within a card and may be substantially flat, with a width larger than the thickness and a length longer than the width. Thus, coil 500 may be provided as, for example, a flattened solenoid or a flattened coil. Alternatively, for example, coil 500 may be cylindrical solenoid or coil.

FIG. 5B shows a coil, for example, of a dynamic magnetic stripe communications device. Particularly, FIG. 5B shows coil 501. A set of conductors 502 may be provided in a first layer (e.g., a first layer of a printed circuit board) and another set of conductors 504 may exist in a second layer (e.g., a second layer of a printed circuit board), and conductors 502 and 504 may be interconnected by vias 503 (e.g., vias of a multiple layer printed circuit board). Conductors 504 may be physically offset from conductors 502 to form, for example, a continuous set of loops. Coil 501 can exist entirely within laminate layers or conductors 502 and 504 may be exposed. Accordingly, coil 501 may be embedded in the polymer (e.g., plastic) of a payment card. Accordingly, coil 501 may be physically protected by such a polymer from the environment. Coil 501 may be configured, for example, using any suitable arrangement of conductors. For example, the pitch between first and second layer conductors may vary.

When excited, coil 501 may, for example, generate a magnetic field that may extend down the center of the coil and out the ends of the coil, and loop back around to the opposing end. This geometry may, for example, approximate finite parallel sheet currents (as discussed above). Because there is space between each of the conductors, for example, a small amount of magnetic field may escape around each individual conductor of an individual loop in the coil. This field and the field produced at the ends of the flattened solenoid are available to couple to the magnetic read-head. The field produced from the bottom layer current in the flat solenoid may, for example, cancel some of the field produced by the top layer current of the flattened solenoid. This may provide coupling to a magnetic card read head, yet the coupling may be weakened. Near the individual wires or at the ends of the solenoid, however, the flat solenoid may provide localized magnetic fields that can more desirably couple to a magnetic card read-head.

The magnitude of a signal provided along the finite length solenoid may depend, for example, on the head position along the coil and relative to the individual conductors (in addition to, for example, the physical spacing of the coil conductors and the read-head to coil spacing).

Use of coil 501 for data transmission may be, for example, most desirable at the regions with the strongest field. These regions may have, for example, a physical length of varying size (e.g., shorter than the length of a magnetic stripe). The data, may be transmitted rapidly, for example, during the periods (or a period) when the card reader head is at these regions (or a region) of coil 501 such that all data is communicated to a reader during a normal swipe.

FIG. 5C shows a device that may provide, for example, a stronger field over a larger portion of a coil. The signal strength may be, for example, approximately uniform over approximately the entire length of the coil (e.g., or another significant portion of the coil). Particularly, FIG. 5C shows a coil 520 with a magnetic material 510 contained within the windings of the coil. Material 510 may be referred to herein as a magnetic core or as the core. Magnetic material 510 may enhance the signal generated by coil 520. For example, the signal may be increased near the ends of the core when compared to a coil without magnetic material 510. Material 510 may be a material having a higher relative permeability that that of air. The magnetic material may be, for example, an alloy compose mostly of magnetic 3-d transition metals, such as Ni, Co, and Fe, and may include, for example, amounts of glass formers such as Si, P and B, but may also include amounts of Mo, Cu, Cr, V, Mn and other elements used to control the crystalline and magnetic properties. However, other magnetic compositions may be provided such as, for example, rare earth alloys or oxides. In general the material may have a response to an external magnetic field that may be considered soft or relatively easy to magnetize.

Material 510 may be provided, for example, in an amorphous or crystalline state or in a bulk, wire, thick or thin film format. Very dense particulate coatings may also be employed, for example, to result in a form having a relatively soft magnetic response to an applied field. Material 510 may be provided in a thin structure to fit into, for example, the thickness of a card with coil 520 wrapped around material 510.

Moreover, material 510 may be, for example, an anisotropic magnetic material resulting in a single preferred orientation of the magnetization. A material or material structure having such a single axis of preferred orientation may be considered having uniaxial anisotropy. This direction is may be considered a magnetic easy axis while the axis at 90 degrees to this preferred direction may be considered a magnetic hard axis. The anisotropy of a given material may be configured, for example, with respect to sample shape, crystalline orientation, strain, or induced by processing conditions such as annealing in the presence of an applied field. For example, the shape anisotropy may be based on unequal, and non-spherical, physical dimensions of the material sample. For example, if a thin material is relatively longer than it is wide, the easy axis may be provided in the length-wise direction. A material may be annealed with an applied field across its width, then an easy axis may be provided across the sample width and the anisotropy may be considered to have been "induced" in the width-wise direction. Anisotropy may also be provided upon, for example, strain resulting from stress applied to the material and may be considered as stress anisotropy (e.g., and related to magnetostriction). A strain of this sort may also be captured, for example, in a sample by being clamped into position or in the material during processing, such as by rapid quenching of the material from a high temperature to a low temperature. Anisotropy may also be provided, for example, on the crystalline structure of the material. For example, hexagonal-close-packed Cobalt may be provided with an easy magnetic axis along the crystalline c-axis. Persons skilled in the art will appreciate that any combination of such factors may be utilized to provide a desired uniaxial anisotropy in material 510.

Coil 520 and magnetic material 510 may be included in a dynamic magnetic stripe communications device. Such a dynamic magnetic communications device, and a read-head, may be represented, for example, as a magnetic circuit. In a magnetic circuit, a coil drive current or a permanent magnet may represent the potential sources, the magnetic flux may represent the magnetic current flow, and the magnetic or non-magnetic portions of the circuit along the flux path may represent the impedance (e.g., and may be referred to as reluctance elements). An approximation for a description of such reluctance element values may be represented, for example, as follows: R=L/uA, where R is the reluctance, L is the length of the circuit element, A is the cross-sectional area of the element and u is the magnetic permeability of the circuit element material where the flux is viewed to be flowing. The permeability may have, for example, directional tensor characteristics as caused by certain forms of anisotropy. For the same dimensions, an air gap in the magnetic circuit may have a higher reluctance than a soft magnetic material 510 since, for example, the permeability of air, $u_o$, may be smaller than that of the soft magnetic material.

Figure 6:
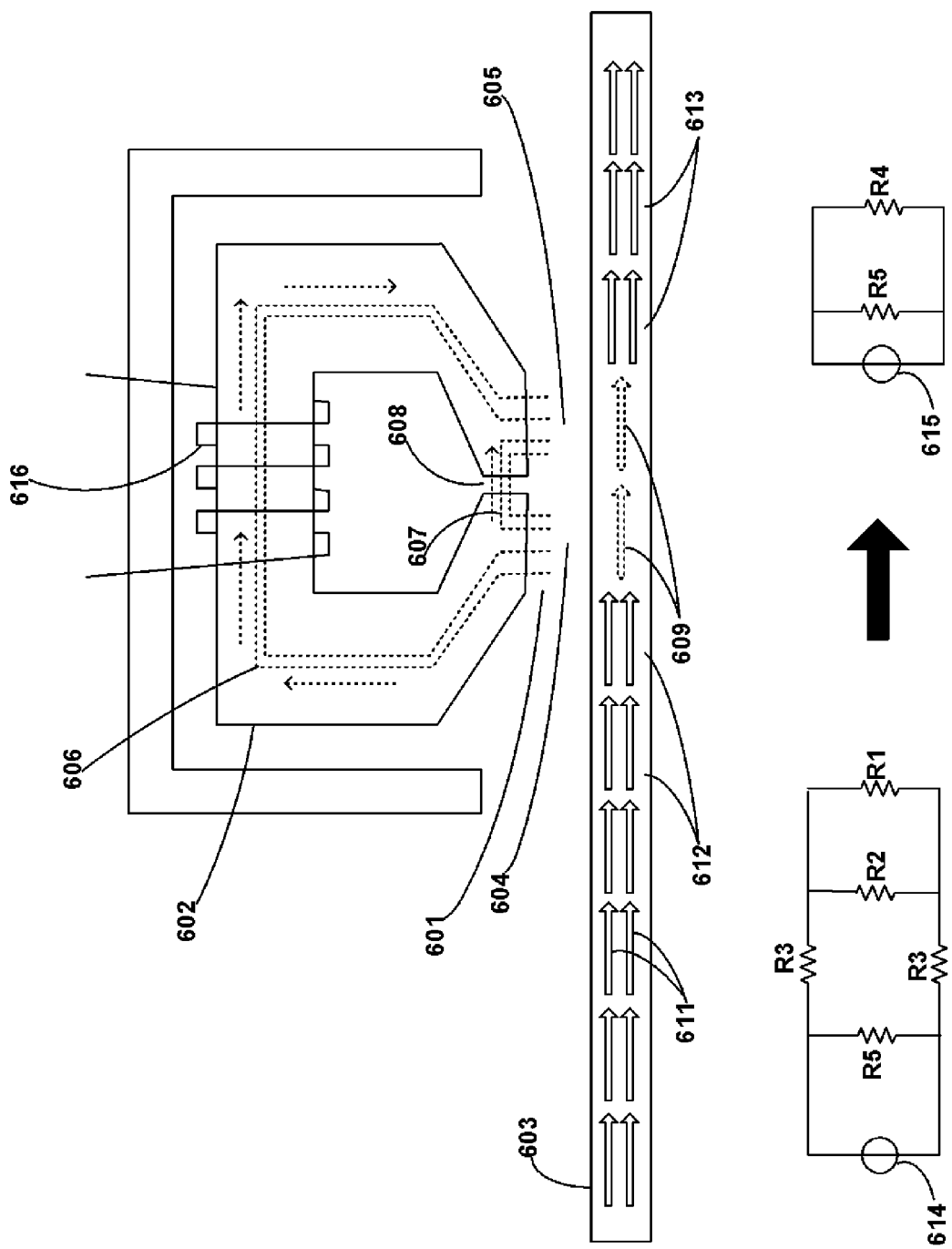
FIG. 6 illustrates a magnetic card read-head near a dynamic magnetic stripe communications device and magnetic circuits constructed in accordance with the principles of the present invention.

When a read-head is placed near a dynamic magnetic stripe communications device, flux carrying paths may exist, for example, both in material 510 and a read-head. The flux path through a read head may be similar to the one shown, for example, in FIG. 6. As shown in FIG. 6, flux may flow through the dynamic magnetic stripe communications device to head air gap regions 604 and 605, and flux carrying paths 606 and 607 of read head 602. The two flux carrying paths, 606 and 607 may be in parallel and compete for the flux, while the paths for regions 604 and 605 may be in series with the 606 and 607 paths. The combination, the paths formed by 604, 605, 606 and 607, may compete for the magnetic flux from dynamic magnetic communications device, structured from a magnetic material (e.g., magnetic material 510 of FIG. 5C) and a coil (e.g., coil 520 of FIG. 5C), with a pathway region, 609, that is inside the same magnetic material of device 603 and that is, for example, immediately below the card reader head regions 604, 605, and 608. Pathways 609 and 607 may represent, for example, inefficiencies for capturing signal flux by a magnetic head (e.g., an inductive magnetic head) via path 606.

The first read-head path, 606, may desirably be around, for example, the head ring and through coil 616. The second read-head path, 607, may be inside the head magnetic material and along the surface head face and includes head gap 608. The reluctance of the first path, 606, is approximated by $R_1=R_r=L_r/u_rA_r$, while $R_f$ is representative of regions just above 604 and 605 and inside the head material, $R_g$ is representative of region 608 and this second path, 607, is approximated by $R_2=2R_f+R_g$, where $R_f=L_f/u_fA_f$ and $R_g=L_g/u_oA_g$, where the subscripts stand for: f=face, g=gap, and r=ring. This portion of the magnetic circuit is shown, for example, in FIG. 6. Magnetic read heads may be configured, for example, where $R_2>>R_1$. Both of these reluctances may be in series with the two gap reluctances formed by a spacing, S, representative of regions 604 and 605 located between the dynamic magnetic stripe communications device and the magnetic head face, $R_3=R_s=S/u_oA_s$. The distance, S, may include air, the thickness of the coil wire and any substrate material used for the coil fabrication or a card cover layer. Hence, the total reluctance of the flux path as it leaves the dynamic magnetic stripe communications device to enter the card reader head and then returns may be, for example, given by $R_4=2R_3+(R_1R_2/R_1+R_2)$ which, because $R_2>>R_1$, is closely approximated by $R_4\sim 2R_3+R_1$.

The magnetic material (e.g., magnetic material 510 of FIG. 5C) may be long compared to the face of read head 601 and may also be viewed, for example, as a flux path, carrying the flux 611 and 609 generated by coil. The dynamic magnetic communications device coil (e.g., coil 520 of FIG. 5C) may provide drive flux along portions of the magnetic material (e.g., magnetic material 510 of FIG. 5C). The reluctance of the magnetic material (e.g., magnetic material 510 of FIG. 5C) may be determined, for example, by its active portion of its length, cross-sectional area and its directional permeability, which may be controlled by its anisotropy. A coil encompassing a magnetic material (e.g., coil 520 about magnetic material 510 of FIG. 5C) along with signal current flowing in the coil may represent a magnetic circuit driving source 614 (or 615), as illustrated in the equivalent magnetic circuits of FIG. 6. When a card reader head face, 604, is, for example, placed adjacent to the dynamic magnetic communications device, portions of the magnetic flux 612 may be shared with the magnetic circuit formed by card reader head. Hence the magnetic flux 609 amplitude in the region of a magnetic material (e.g., magnetic material 510 of FIG. 5C) immediately in the vicinity of the head face 604 is reduced from the amplitude of flux at 611, 612 and 613. This missing portion of the flux may be considered, for example, as being coupled into the card reader head. Most of the portions of the drive flux which are coupled to the card reader head circuit may be originating from regions of the dynamic magnetic communications device coil (e.g., coil 520 of FIG. 5C) and magnetic material (e.g., magnetic material 510 of FIG. 5C) existing at nearby locations 612 and 613, on each side of the face of the card reader head core 602.

This coupled flux may, for example, traverse the flux paths 606 and 607 through read head 602 while the uncoupled portion of the flux 609 largely traverses inside the dynamic magnetic communications device magnetic material in the region (e.g., of magnetic material 510 of FIG. 5C) at the face section 601 of read head 602. Hence, the length of the read head face, $L_f$, approximately determines the relevant reluctance path length, and hence, reluctance, $R_5$, of the dynamic magnetic communications device that is in parallel with reluctance $R_4$ formed by the head structure and head to stripe (e.g., all or a portion of dynamic magnetic communications device such as a magnetic material included in the dynamic magnetic communications device) spacing. This length dimension may correspond to approximately $2L_f$ of the head face area, $A_f$. The other dimension of the area of the reluctance, $A_f$, may be determined by the portion of the head width, which overlaps with the width of the dynamic magnetic communications device magnetic material (e.g., magnetic material 510 of FIG. 5C). The head width in the vicinity of the gap corresponds approximately to the recording trackwidths W, in a magnetic card. Whereas the effective magnetic material reluctance in the vicinity 609 of the read head face can be approximated by $R_5 = R_{MM} = 2L_f / u_{MM} A_{MM}$ where MM stands for the magnetic material of the dynamic magnetic communications device and the cross-sectional area may be determined, for example, by the width and thickness of the magnetic material (e.g., magnetic material 510 of FIG. 5C). $R_5$ may be in parallel with $R_4$ and, as such, competes as a flux path for the drive source flux 611 or 614.

To provide desirable coupling of the drive signal to the head pick up coil 206, reluctance of the magnetic material (e.g., magnetic material 510 of FIG. 5) in the region near the head, $R_5$, may be provided, for example, greater than, or comparable to, the total reluctance of read-head circuit, $R_4$. The flux that couples into the magnetic card reader head from the magnetic material (e.g., magnetic material 510 of FIG. 5C) may be approximated, for example, by $F_r = F_{sc}(R_4/(R_5 + R_4))$ where F stands for flux and $F_{sc}$ represents the flux from the coil drive signal that is entering magnetic material region near the head location. $F_r$ represents the flux that passes through the card reader head coil (e.g., which may be an inductive head coil) and so the induced voltage from the head is given by $dF_r/dt$. This amplitude may be, for example, approximately proportional to $R_4/(R_5+R_4)$. By maintaining this reluctance relationship, $R_5 \sim R_4$, between magnetic material and read-head, a significant portion of the flux may tend to flow through the read-head sensing coil. This may assist, for example, the read-head in picking up signals from the dynamic magnetic stripe communications device essentially independent of the position of the head along the length of the dynamic magnetic communications device. This uniformity characteristic along the length of the dynamic magnetic communications device may provide desirable advantages and may be provided by, for example, the magnetic material (e.g., magnetic material 510 of FIG. 5C) and the device possess the proper reluctance value.

A card reader may have a fixed reluctance. Accordingly, for example, an electronic card may be provided with various ways to control the reluctance of materials contained in the card in order to more desirably communicate information to a card reader read-head (e.g., via a dynamic magnetic stripe communications device). In particular, the reluctance of the magnetic material (e.g., magnetic material 510 of FIG. 5C) near the head may be appropriately configured and controlled. Anisotropy may be utilized, for example, in controlling the reluctance of a dynamic magnetic communications device of an electronic card.

Figure 7A:
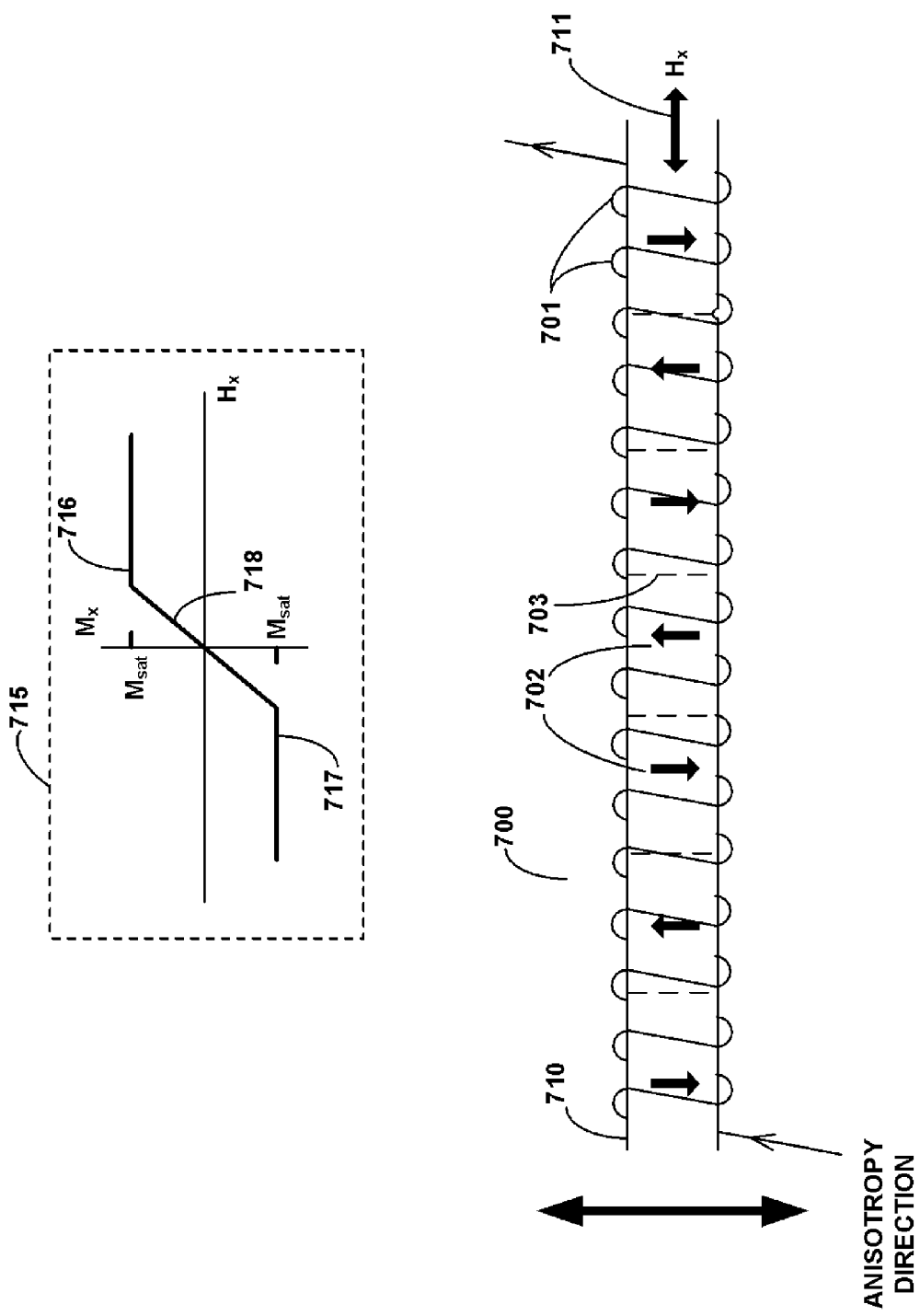

FIG. 7 shows magnetic response function, 715, Mx to an applied field Hx. Persons skilled in the art will appreciate that with sufficient drive field, ±Hx, the magnetization may saturate at Msat, 716 and 717. Persons skilled in the art will also appreciate that, prior to saturation, for example, Mx is linear with Hx. The slope of the linear portion, 718, of this curve corresponds to Mx/Hx=(u−1)~u, since for soft magnetic materials u>>1. This type of response may, for example, provide for more desirable performance of a dynamic magnetic stripe communications device of an electronic card.

The reluctance may be controlled, for example, by setting the length, width, thickness and extrinsic anisotropy of a magnetic material (e.g., magnetic material 510 of FIG. 5C). The extrinsic permeability of the magnetic material may then be controlled by, for example, the net resulting extrinsicly determined anisotropy. The magnetic anisotropy may be, for example, the characteristic of a magnetic material to respond differently along different directions to an applied magnetic field. In particular, uniaxial anisotropy may result in the magnetization responding more easily along one axis than along the other Cartesian axes. Such a direction may be referred to as the easy axis while directions at right angles to this may be referred to as the hard axis. When a magnetic material (e.g., magnetic material 510 of FIG. 5C) has unequal dimensions the minimization of the self energy of the magnetic field may cause, for example, the magnetization vector to seek the longest dimension, the easy axis. In particular, when the shape is that of a magnetic stripe, for example, the easy axis in along the length and the hard axes are perpendicular to this. Because of this same energy minimization the magnetization of the material may form into domains, or magnetic regions, where the magnetization vectors point along the easy axis, but in opposing directions. Such a configuration is referred to as being demagnetized. For a material, for example, with an easy axis long the length of the stripe (e.g., dynamic magnetic stripe communications device), a model of such a state may be of two domains with a domain wall running the length of the stripe and separating the two domains each having a magnetization vector pointing along, but opposing, the length of the stripe. As an applied field, Hx, may be directed along the length of the stripe the magnetic domain in the direction of the applied field grows at the expense of the other domain as the domain wall slides from one side of the stripe (e.g., all or a portion of a dynamic magnetic stripe communications device such as a magnetic material included in a dynamic magnetic stripe communications device) to the other. This process may result in a self energy increase exactly corresponding to the energy supplied to the magnetic material via the external applied field. Hence, the magnetization along the stripe (e.g., all or a portion of a dynamic magnetic stripe communications device such as a magnetic material included in a dynamic magnetic stripe communications device), Mx, may increase linearly with the applied field, Hx, until, for example, the material saturates as the volume of one domain tends to vanish. The self energy may be considered as demagnetization energy as it opposes the magnetization direction. Accordingly, as the material is magnetized, a demagnetizing field may be just balancing the applied field. In terms of the response function 715, the Hx may be the field along the easy axis and Mx may be the resulting net magnetic moment of the sample along this same axis.

Persons skilled in the art will appreciate that, in this example, the material may have a shape dominated anisotropy and shape and the magnetization of the material may determine the response function slope, 718, of 715. Other forms of anisotropy may be utilized, including, for example, magnetocrystalline, stress, and induced. Such alternative forms of energy as well as shape anisotropy may be utilized to either, for example, compete or complement each other to provide the easy magnetic axis.

A very high intrinsic permeability material such as, for example, Permalloy (e.g., an alloy of Ni and Fe) material may be provided in the dynamic magnetic stripe communications device as the magnetic material. Such a high permeability material may desirably boost, for example, the flux from the drive signal provided by dynamic magnetic stripe communications device resulting in the resulting magnetization varying rapidly as a function of the applied field. However, if the anisotropy direction, and hence the easy axis, is along the length of the stripe as discussed, the domains may be oriented such that the magnetization vector coincides with ±Hx with domain walls which run along the stripe length. This results in motion of these domain walls when a field, Hx, is applied. The reluctance of such a material sample may be controlled, for example, to provide a dynamic magnetic stripe communications device. However, the resulting domain wall motion may result in abrupt changes in magnetization, Mx and, accordingly, may not be as advantageously desirably controlled with respect to the applied field, Hx. Persons skilled in the art will appreciate that the abrupt changes may occur as the domain walls hang up at defects, localized inhomogeneities, or localized strained regions and then break loose with increasing applied fields causing rapid changes in magnetization and noise in the resulting head signal. Such domain wall motion induced noise may be considered, for example, Barkhausen noise. Persons skilled in the art will appreciate that when extensive domain wall motion is allowed to occur, for example, non-advantageous communication may be induced in the head reader. However, applying an additional external field, referred to as a bias field, along the magnetic hard axis, across the width of the magnetic stripe, may, for example, ameliorate noise and may result in a more uniform magnetic response as a function of the head position along the stripe. Accordingly, such a field may effectively increase the reluctance of 603 of FIG. 6 and may result in, for example, more signal reaching the head coil. This may be especially true with, for example, permalloy based devices which may initially have had very low reluctance. The application of such a constant bias field perpendicular to the stripe (e.g., all or a portion of a dynamic magnetic stripe communications device such as a magnetic material included in a dynamic magnetic stripe communications device) length directed easy axis tends, for example, to rotate the magnetization away from the easy axis. Hence, when signal coil is excited, it may increase the magnetic flux via magnetization vector rotation away from the bias field direction and into the stripe (e.g., all or a portion of a dynamic magnetic stripe communications device such as a magnetic material included in a dynamic magnetic stripe communications device) length, magnetic easy axis, direction. This may result in, for example, a net Mx vs Hx response function which is no longer precisely linear, but is somewhat as illustrated in 830 of FIG. 8. Such a process may be advantageously different from controlling the anisotropy energy, but may considered, for example, as method of controlling the reluctance of this type of magnetic material. However, even with the advantages provided by this perpendicularly directed bias field, this type of material and anisotropy geometry may be disadvantaged from difficulty of manufacturing process control resulting in Barkhausen noise.

FIG. 7 also shows a dynamic magnetic stripe communications device 700 having a coil 701 that encompasses magnetic material 710, which has a uniaxial anisotropy across its width, as noted in the figure and by the magnetization directions 702. The magnetic easy axis lies perpendicular to Hx and in the stripe plane. Hence, the x direction is the magnetic hard axis. This anisotropy, along with the demagnetization energy caused by the finite cross width direction of the magnetic material 710 of the stripe geometry, may cause magnetic domains 702 to appear as shown by the alternating arrows, representing magnetization regions, and separated by the domain walls 703, noted as dashed lines. Absent any current flowing through coil 701, no substantial magnetic field, Hx, along the stripe (e.g., all or a portion of a dynamic magnetic stripe communications device such as a magnetic material included in a dynamic magnetic stripe communications device) length direction may exist and the roughly equal set of domains depicted may result. However, for example, when current flows through coil 701, as shown, a magnetic field, Hx, may be provided down the length-wise direction of material 710. When the magnetic field, Hx, 711 is present, the field may, for example, tend to rotate the magnetization of the domains along the length-wise direction of material 710 in a linear manner and without significant domain wall motion. This rotation of the magnetization may create, for example, a magnetization component, Mx, which contributes to the magnetic flux of dynamic magnetic stripe communications device 700 in a linear manner as a function of the magnetic field, Hx. Referring briefly back to FIG. 6, in the absence of a magnetic head this flux may pass along the reluctance represented by $R_5$. Again, graph 715 of FIG. 7 shows Magnetization, Mx, as a function of the applied magnetic field, Hx, which may be based, for example, on the coil current. However, unlike before, the direction of Hx may now be, for example, along the hard magnetic axis and the slope of this curve may be largely determined by the dominate cross-width directed anisotropy energy in combination with the weaker along-the-length directed shape anisotropy. The slope of the curve in graph 715 may depend upon, for example, the saturation magnetization as well as the anisotropic properties of the magnetic material 710 and so the amplitude of Mx depends upon the strength of the applied magnetic field, Hx. When the magnetic field becomes large, the magnetization again may, for example, reach a limiting value and may be considered to saturate and become independent of Hx in regions 716 and 717.

The reluctance may be, for example, controlled by setting the length, width, thickness and intrinsic induced or magnetocrystalline anisotropy, along with the shape anisotropy, of the magnetic materials 710. The extrinsic permeability of magnetic material 710 may then be controlled by, for example, the net anisotropy resulting from the competition from the various possible forms of anisotropy. The net anisotropy may be set, for example, to be across the width of the stripe and at a value satisfying the reluctance criteria already discussed. Additionally, applying a bias field along the easy axis may be utilized to result in, for example, improved noise performance (e.g., when the material is driven to or near saturation) and increased uniformity of signals as a function of head position along the stripe (e.g., all or a portion of a dynamic magnetic stripe communications device such as a magnetic material included in a dynamic magnetic stripe communications device) length. Generally, the magnetization rotation mechanism of the this embodiment may include desirable advantages over the domain wall motion of the earlier embodiment as domain wall motion may be, for example, more subject to material defects and localized stresses resulting is less desirable controlled behavior of Mx vs. Hx.

The extrinsic anisotropy of magnetic material 710 may, for example, be employed to influence the reluctance of device 700. Material 710 may, for example, have shape anisotropy, stress anisotropy, magnetocyrstalline anisotropy, induced anisotropy, or any combination thereof. For example, thin films of permalloy, and other alloy materials such as Si based steels, may be annealed to provide induced uniaxial anisotropy across the stripe width. Epitaxial thin film growth techniques may also be utilized to produce thin films with uniaxial anisotropy.

Material 710 may be, for example, an amorphous alloy material, formed by rapid quenching, which was annealed in an applied magnetic field to produce an induced uniaxial anisotropy energy density that exists across its width. Magnetic material 710 may have, for example, a ribbon-like shape, where it has a long length to width ratio, and is substantially thin compared to its other dimensions. The combination of the induced anisotropy and the finite length of material 710 in the dynamic magnetic communications device may tend to maintain its magnetic easy axis across its width as the shape anisotropy may be insufficient to dictate an easy axis along its length. When a coil current is applied, for example, a magnetic field may be generated to drive the magnetization away from the cross-width orientation towards the cross-length orientation. Accordingly, the magnetization orientation may be reoriented, for example, from the easy axis, which is across the width, toward the hard axis, which is along the length. This induced cross width anisotropy energy density may increase the length-wise reluctance of magnetic material 710. As a result, a card reader head signal may be desirably increased and more uniform along the length of device 700. In addition, the magnetic flux may tend to follow the lower reluctance, $R_5$, read head path rather than the reluctance, $R_4$, formed by the path through magnetic material 710.

FIG. 7B shows an alternative magnetic material configuration that may be used to control, for example, reluctance of dynamic magnetic communications device 720. Dynamic magnetic communications device 720 may include, for example, coil 721 and magnetic materials 730 and 732, which may be stacked on top of each other. Although only two materials 730 and 732 are shown, additional such materials may be included. For example, three, four, or five materials may be included. Magnetic materials 730 and 732 may both have, for example, anisotropy resulting in across the width easy magnetic axis. With two pieces of across-the-width anisotropic materials, the across-the-width demagnetization field may be, for example, lowered such that the shape anisotropy is less dominating. The magnetic flux from the width edge of one piece may, for example, couple to the edge of the second piece to form a closed circular flux path 740. This geometry may, for example, be considered as a "circulatory anisotropy arrangement." The flux may traverse across one width and back across the second. Hence, the magnetic charge at the edge, which may cause the demagnetization fields, may be, for example, reduced and the magnetization vector may remain in the across-the-width direction with even less induced anisotropy. When current is driven through coil 721, the drive field may, for example, rotate both magnetization vectors, one in each piece of material, towards the length, thereby providing a controlled reluctance of device 720 with increased magnetization and hence increased magnetic flux. This circulatory anisotropy arrangement may, for example, not require an across-the-width applied bias field (discussed in more detail below), though one can be added to further adjust the reluctance and control noise. The reluctance of this circulatory anisotropy arrangement may be further controlled, for example, by controlling the spacing between materials 730 and 732. By inserting a non-magnetic material, for example, the demagnetization fields can be increased to shift the weighting of the circulatory anisotropy energy density versus the shape demagnetization anisotropy. Doing so may, for example, decrease the reluctance for magnetization directed down the length of device 720.

FIG. 7C shows an additional magnetic material configuration that may be used in dynamic magnetic communications device 750. Device 750 may, for example, include one or more round wires 760 that may be encompassed by a coil (not shown). Magnetic wire 760 may be derived, for example, from an amorphous alloy material that had been rapidly quenched in water. Wire 760 may be stressed and, due to magnetostriction, may result in an easy axis anisotropy where the anisotropy direction is a circumferential path 765 around the wire. This may be considered a circulatory anisotropy arrangement. This shape and anisotropy orientation may, for example, decrease demagnetization effects along the short axial direction as there may be effectively no end to the material in the circumferential direction. Two or more wires may be placed in a parallel configuration increase the amount of magnetic material, and thereby may further control, for example, the reluctance while increasing the magnetic flux. In a manner similar to the two piece geometry of across-the-width easy magnetic axis anisotropic materials (e.g., as discussed above in connection with FIG. 7B), the solenoid core reluctance may be controlled. An across-the-diameter bias magnetic field (discussed below) may also be used to provide an additional device design parameter.

A piece of solenoid core material may be utilized, for example, which is magnetostrictive. Accordingly, for example, the material may be assembled into the dynamic magnetic stripe communications device in such a manner that the material may be under tension or compression. By configuring a material with the proper magnetostriction coefficient and putting it under strain, a magnetostrictive anisotropy energy density may develop an easy axis that is perpendicular to the stripe (e.g., all or a portion of a dynamic magnetic stripe communications device such as a magnetic material included in a dynamic magnetic stripe communications device) length. When current is driven in the coil, the magnetization may rotate from the across-the-width direction to the down-the-length direction. Thus, the reluctance may be, for example, controlled by the strain.

Although magnetic material 710 may influence the reluctance of device 700, additional control of reluctance may be desired. Additional control of the reluctance of dynamic magnetic communications device 700 may be achieved, for example, by applying a bias magnetic field. The bias field may be, for example, permanent or time varying. If time varying, the bias magnetic field may be synchronized with the drive coil current. The bias magnetic field may change the magnetization vector of magnetic material 710. Depending on the provided bias magnetic field orientation, the magnetic field may, for example, "work" harder to rotate the magnetic domains, thereby increasing the reluctance. By adjusting the bias magnetic field strength, the reluctance of device 700 may be tuned, for example, to provide an optimal quantity of flux is provided to the read-head. The bias magnetic field may also improve the read-head signal by, for example, increasing its amplitude, lowering its noise, and maintaining it substantially uniform as a function of the head position with respect to the moving card. Accordingly, device 700 may, for example, provide a strong signal for all positions along its length. The length of device 700 may be, for example, approximately 0.5 inches to 3.0 inches or longer. Alternatively, for example, the length of device 700 can be between 1 and 3.25 inches, 2 an 3 inches, or 2.75 and 3.25 inches.

Figure 8:
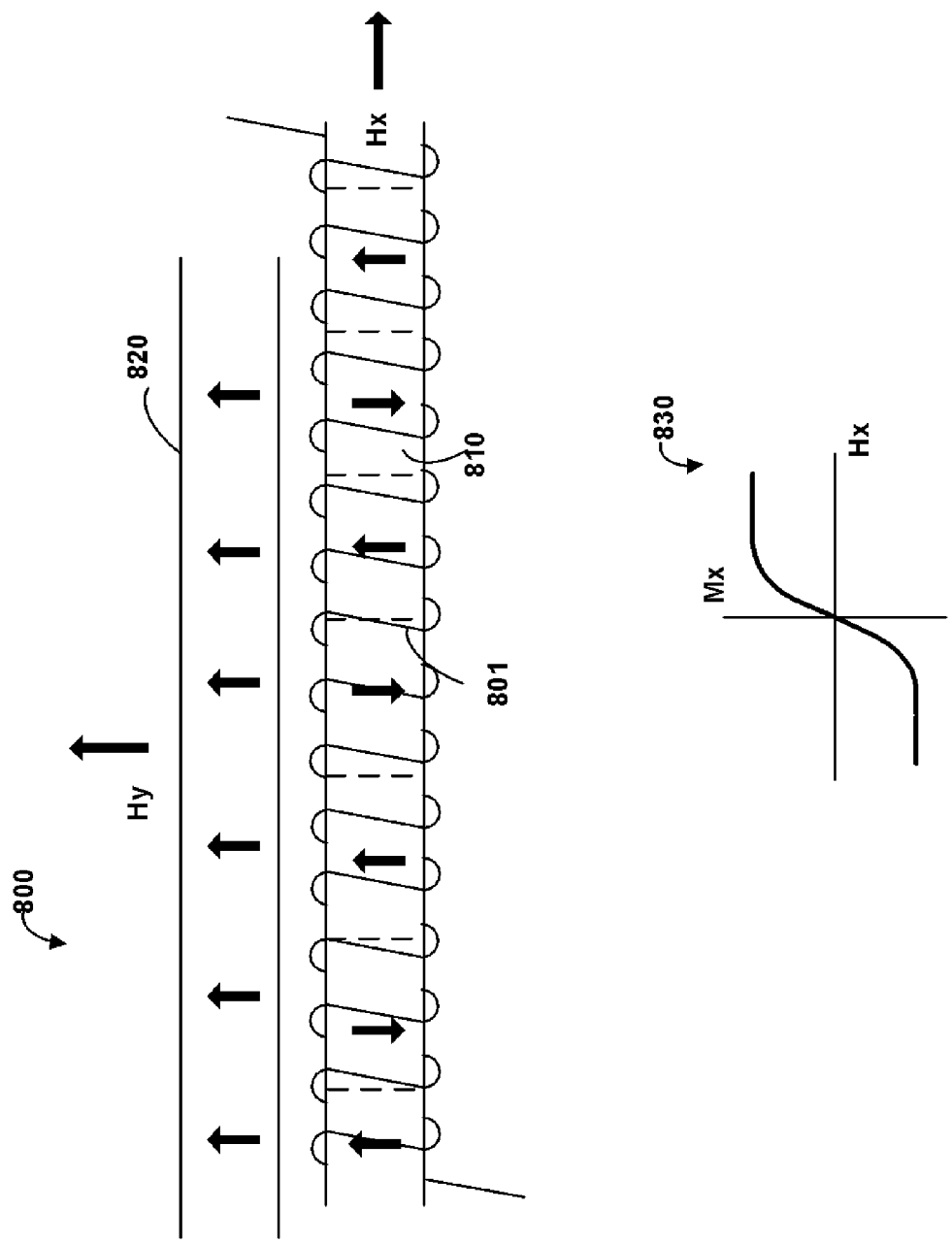
FIG. 8 illustrates the use of a bias field constructed in accordance with the principles of the present invention.

FIG. 8 shows dynamic magnetic stripe communications device 800 that may include coil 801 encompassing magnetic material 810 and a bias magnetic field generation device 820. Device 820 may be positioned on one side of magnetic material 810. Device 820 may be a permanent magnet, a coil, or a wire. Magnetic material 810 may have the same anisotropic arrangement as material 710 of FIG. 7A and may have multiple layers as 720 of FIG. 7B. Bias field generation device 820 may provide, for example, a magnetic field that biases the magnetic field in the y-axis direction, denoted by Hy. This bias field alters the magnetization vector of magnetic material 810, and in this embodiment, may increase the reluctance of device 800, as the magnetic field in the x-axis direction has to rotate the altered magnetization vector. Graph 830 plots the magnetization and applied magnetic field in the x direction. As shown, the bias field provided by device 820 rounds the magnetization curve about the saturation point. When driven with a linear ramp signal, this magnetization curve may result in final signal pulse shape comparable to, for example, a desired Lorentzian pulse shape (e.g., the shape observed in 305 of FIG. 3).

Persons skilled in the art will appreciate that the bias field provided by device 820, the anisotropy of material 810, magnetic material 810 geometry and other factors may be selected, for example, to control the reluctance of device 800. For example, material 810 may be provided with an anisotropy resulting in the magnetic easy axis orientation being down the length of the core, for example, an across-the-width bias field may be used to reorient the magnetization vector to yield a high quality, uniform, flattened signal response amplitude along its length. This may enable data to be more desirably communicated, for example, at all locations along material 810. Likewise, increasing the induced anisotropy energy density (i.e., the bias magnetic field) across the width of magnetic material 810 may be employed to overcome shape demagnetization, for example, to provide a more desirable magnetization orientation.

Figure 9:
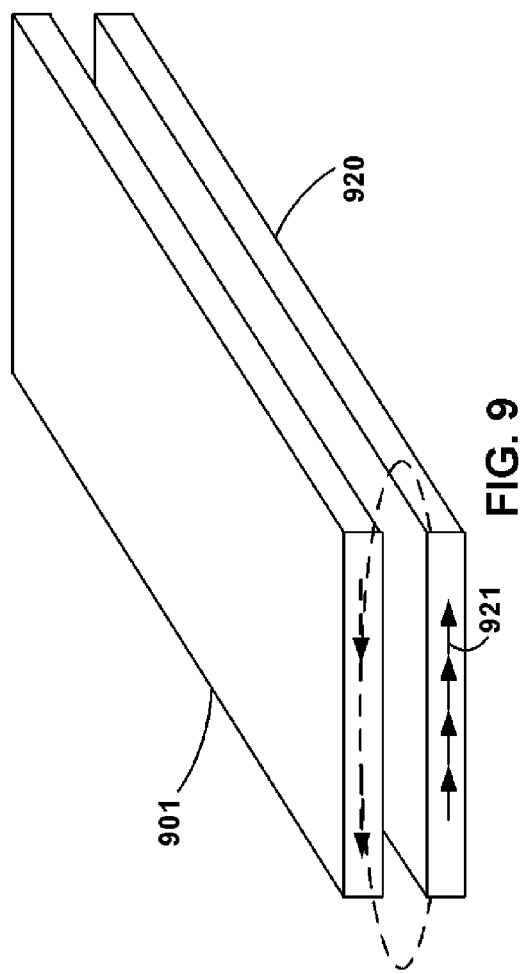
FIGS. 9 and 10 illustrate additional uses of bias fields constructed in accordance with the principles of the present invention.
Figure 10:
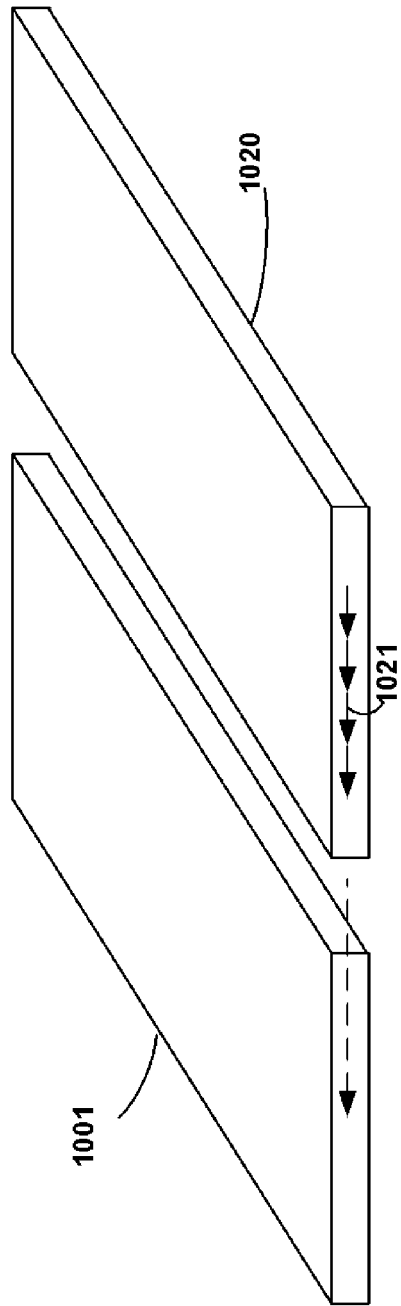

FIGS. 9 and 10 show uses of a magnetic bias field with respect to a coil assembly, which can include a coil that encompasses a magnetic material. In FIG. 9, coil assembly 901 may be positioned above bias field generation device 920. Bias field generation device 920 may provide, for example, bias magnetic field 921 in the direction as shown. Field 921 may, for example, emanate from the edge of device 920 and pass through the width of coil assembly 901, as shown by the dotted lines. FIG. 10 shows coil assembly 1001 positioned adjacent to and in the same plane as bias field generation device 1020. Device may provide bias field 1021, which passes across the width of coil assembly 1001. The bias field generation device, 920, may be located, for example, either inside or outside of excitation coil 721.

The bias field intensity may, for example, be uniform along the length of device 920 of FIG. 9 or 1020 of FIG. 10. Alternatively, for example, the bias field intensity may be non-uniform along the length of device 920 of FIG. 9 or 1020 of FIG. 10. For example, if device 920 of FIG. 9 is a permanent magnet, its magnetization can be adjusted in value to be non-uniform with position (e.g., near the ends of coil assembly 901) to cause, for example, a signal response to be more uniform as a function of position. A permanent magnet may be magnetized to different degrees in different portions of the magnet to generate, for example, various magnetic field profiles. Likewise, the volume of the permanent magnet may be varied, for example, to yield a desired field magnitude profile.

The reluctance of the magnetic material may be altered dynamically while also being driven by the coil. An across-the-width bias field may, for example, be varied dynamically when produced by a current. This field may be provided, for example, during portions of the time when the drive field is active. The drive field may be applied on a DC basis, for example, during the emulation process or only temporarily while portions of the drive current are applied. Thus, the reluctance may be, for example, altered with minimal power consumption. The drive field may be rotate, for example, from being across the width to partially down the length dynamically.

The reluctance of the solenoid core may be altered dynamically, for example, while being driven by the coil, with the same, or other, coil windings pitched at an angle rather than being straight across the width of the magnetic material stripe. The pitch angle may be adjusted, for example, to make desirable usage of the coil area. The flattened coil design may result, for example, in a natural pitch equivalent to approximately equal to the ratio the width of the coil wire and coil width. This pitch is, for example, illustrated in FIG. 5 by the angle of the bottom conductor path 504 relative to the top conductor 502. However, the pitch may be, for example, increased and included on either or both conductors to produce a larger component of the drive field which is across the width of the dynamic magnetic stripe communications device. For example, the pitch angle may be as much as 65 degrees (e.g., or more) to the cross track direction without significantly reducing the number of turns in the drive coil.

The reluctance of the dynamic magnetic stripe communications device may be varied, for example, by constructing the drive coil and magnetic core in a completely different, orthogonal, geometry. For example, the magnetic material may be partially magnetized along its length. The resulting bias flux may be coupled, for example, to the card reader head via its lower reluctance path. A coil may be provided, for example, such that the drive magnetic field direction is across the width of the magnetic material. The magnetic material may have a net anisotropy easy axis which may, for example, be either (1) across-the-width of the material or (2) down-the-length of the material. In case (1) a bias field may be, for example, supplied in an orientation down-the-length of the dynamic magnetic stripe communications device, to cause the core material magnetization to be canted at an angle >0 but <90 degrees relative to the dynamic magnetic stripe communications device width direction, but to have a net magnetic moment in the direction of the length of the dynamic magnetic stripe communications device. Either a permanent magnet or a current creating field may be used, for example, to provide this bias field resulting in a net magnetization moment pointing down-the-length of the electronic stripe. As the drive coil, which may be oriented to create a magnetic field intensity across-the-width of the dynamic magnetic communications device is excited, for example, this may cause the magnetization to rotate towards the across-the-width electronic stripe direction. Hence, the magnetization moment down-the-length of the electronic stripe may be, for example, decreased or increased depending upon the drive current direction. This may, for example, induce a change in the bias flux in the ring head resulting in the desired signal. In the operation of case (2) the bias field may be oriented to cause the core material to both have a net magnetic moment down-the-length of the magnetic communications device and also be canted at an angle relative to the across-the-width stripe direction. As the across-the-width dynamic magnetic communications device drive field is excited the magnetization vector may be caused to rotate either towards the across-the-width or toward the long axis of the electronic stripe. As this rotation occurs the magnetization along the length of the communications device may decrease or increase, respectively. This, in effect, may, for example, modulate the flux that was in the magnetic ring head coil resulting in the desired signal.

A dynamic communications device may be provided, for example, that utilizes the circulatory anisotropy arrangement and a current driven down the center of the magnetic material may cause the magnetization to want to point around the circulatory anisotropy direction. Hence, by applying a bias field to cause a net magnetic moment along the length of the magnetic material, there may be, for example, a net flux in the low reluctance path of the magnetic card reader head. When the current is driven down the length of the circulatory anisotropy core, the magnetization vector may, for example, rotate into the circulatory orientation decreasing the magnet moment of the magnetic material along its length causing a decrease in the flux in the magnetic card reader head coil. Hence, a signal may be transferred from, for example, the drive coil to the card reader head. This circulatory anisotropy arrangement material may be either the round cross-sectional wire geometry or the multiple flat piece construction, as discussed above. In the case of the two piece construction, for example, a separate conductor may be placed between magnetic pieces to carry the current.

Persons skilled in the art will also appreciate that the present invention is not limited to only the embodiments described. Instead, the present invention more generally involves dynamic information and magnetic emulation. Persons skilled in the art will also appreciate that the apparatus of the present invention may be implemented in other ways than those described herein. All such modifications are within the scope of the present invention, which is limited only by the claims that follow.

What is claimed is:

1. A card comprising: a bias magnetic field generation device; a first conductive coil; and a uniaxially anisotropic soft magnetic material within said first conductive coil,
    wherein dimensions of said soft magnetic material include a length, a width, and a thickness,
    said length is greater than said width, and said width is greater than said thickness,
    an easy axis of said soft magnetic material is in a widthwise direction of said soft magnetic material, said easy axis being perpendicular to a lengthwise direction of said soft magnetic material, and
    a bias magnetic field of said bias magnetic field generation device is in said widthwise direction.

2. The card of claim 1, wherein a reluctance of said soft magnetic material is controlled by said bias magnetic field, and said bias magnetic field is produced by a permanent magnet.

3. The card of claim 1, wherein a reluctance of said soft magnetic material is controlled by said bias magnetic field, and said bias magnetic field is produced by a current in said first coil.

4. The card of claim 1, wherein said first coil is at least ½ half inch long.

5. The card of claim 1, wherein said first coil is at least 1.5 inches long.

6. The card of claim 1, further comprising a second coil.

7. The card of claim 1, further comprising:
a second coil,
wherein said second coil comprises a soft-magnetic material.

8. The card of claim 1, further comprising:
a second coil,
wherein said card is operational without a static magnetic stripe.

9. The card of claim 1, further comprising:
a second coil; and
a processor,
wherein said processor is operational to control current supplied to said first coil and said second coil such that a first track of information is communicated through said first coil and a second track of information is communicated through said second coil.

10. The card of claim 1, further comprising:
a second coil; and
a processor,
wherein said processor is operational to control current supplied to said first coil and said second coil such that a first track of information is communicated through said first coil and a second track of information is communicated through said second coil, wherein said first and second tracks of data each comprise a payment number that is the same on both tracks.

11. The card of claim 1, further comprising:
a second coil; and
a processor,
wherein said processor is operational to control current supplied to said first coil and said second coil such that a first track of information is communicated through said first coil and a second track of information is communicated through said second coil, wherein at least one of said first and second tracks of data comprises a payment number.

12. The card of claim 1, further comprising:
a second coil; and
a processor,
wherein said processor is operational to control current supplied to said first coil and said second coil such that a first track of information is communicated through said first coil and a second track of information is communicated through said second coil, wherein at least one of said first and second tracks of data comprises a payment number and said payment number was generated by said processor based on time.

13. A card, comprising:
a dynamic magnetic stripe communications device including a bias magnetic field generation device, the dynamic magnetic stripe communications device operable to communicate data to a magnetic stripe card reader, a reluctance of the dynamic magnetic stripe communications device greater than a reluctance of the magnetic stripe card reader,
wherein the dynamic magnetic stripe communications device further comprises a coil that encompasses a uniaxially anisotropic magnetic material, the coil having a length and a width,
the uniaxial anisotropy is across the coil width, and a bias magnetic field produced by the field generation device is provided across the coil width.

14. The card of claim 13, wherein the bias magnetic field generation device comprises a permanent magnet.

15. The card of claim 13, wherein the bias magnetic field generation device comprises at least one of a coil and a wire.

16. The card of claim 13, wherein the bias magnetic field contributes to the reluctance of the dynamic magnetic stripe communications device.

17. The card of claim 13, wherein the anisotropy of the uniaxially anisotropic magnetic material is one of a shape anisotropy, a stress anisotropy, a magnetostriction anisotropy, an induced anisotropy, and any combination thereof.

18. The card of claim 13, wherein the field generation device provides a uniform bias field.

19. The card of claim 13, wherein the field generation device provides a non-uniform bias field.

* * * * *